Dec. 5, 1950
G. C. HESS
2,532,307
SIGNAL RESPONSIVE SYSTEM
Filed July 29, 1944
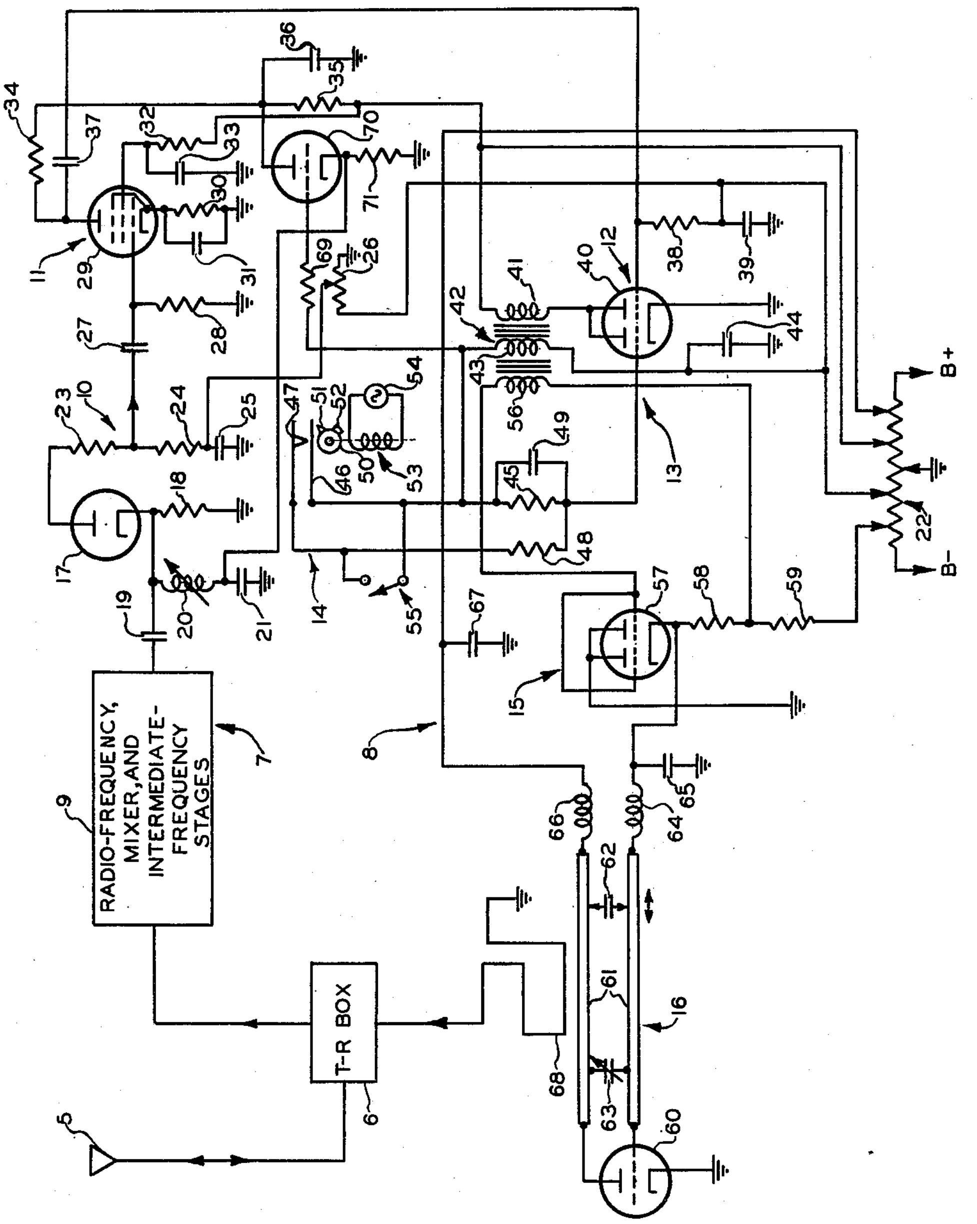
INVENTOR.
GERARD C. HESS
BY William L. Hall
ATTORNEY Patented Dec. 5, 1950 2,532,307

UNITED STATES PATENT OFFICE 2,532,307

SIGNAL RESPONSIVE SYSTEM

Gerard C. Hess, Asbury Park, N. J., assignor to the United States of America as represented by the Secretary of War Application July 29, 1944, Serial No. 547,242

9 Claims. (Cl. 250—15)

(Granted under the act of March 3, 1883, as amended April 30, 1928; 370 O. G. 757)

The invention described herein may be manufactured and used by or for the Government for governmental purposes, without the payment to me of any royalty thereon.

My present invention relates to radio beacon systems, and more particularly, to beacon systems of the so-called interrogator-responder type.

Such a system usually includes a transmitter, known as an interrogator, generally carried in an airplane; and a transmitter-receiver, known as a responder, generally located at a landing field. When the occupants of the airplane seek to "home" on the beacon, they transmit interrogating signals, in the form of audio frequency pulses of radio frequency energy, which, upon reception at the responder, trigger the transmitter thereof to radiate "homing" signals, also in the form of audio frequency pulses of radio frequency energy. These signals are received at the airplane, and utilized, in a variety of ways which need not be described herein, to guide said airplane to the site of said landing field.

My present invention concerns itself with the aforementioned responder; especially, the modulator for keying the transmitter thereof in response to the aforementioned interrogating signals.

It is one of the objects of my present invention to provide such a modulator with sufficient sensitivity to enable interrogating signals of low intensity to fire the same and, at the same time, set a threshold value for such firing which will prevent unwanted triggering by the random noise of the receiver.

It is another object of my present invention to provide the aforesaid modulator with sufficient stability to prevent bias or plate voltage variations from firing the same.

It is still another object of my present invention to provide a modulator of such design that the width of the keying pulses generated thereby remains constant notwithstanding changes in the repetition rate of the triggering signals.

It is a further object of my present invention to provide a modulator which may be connected to the transmitter without the necessity for the usual coupling capacitor and resistor, thereby preventing waveform distortion.

It is a still further object of my present invention to provide a modulator of such design as to generate keying energy of high amplitude while retaining a low output impedance, which may be easily matched to that of the transmitter.

It is still another object of my present invention to prevent the ground transmitter from keying itself, even though said transmitter and the ground receiver utilize a common antenna system.

These, and other objects and advantages of my present invention, which will be better understood as the detailed description thereof progresses, are attained in the following manner:

The pulse output of the ground receiver, consisting of the interrogating signals from the airborne transmitter, are fed to a pulse amplifier which is normally biased beyond cutoff by an amount at least equal to the amplitude of the receiver noise. The amplified pulses thus obtained are fed to a normally inoperative blocking oscillator to trigger the same and generate keying pulses. The width of the keying pulses is determined by the resistance in the grid circuit of the blocking oscillator, and by altering said resistance at and for predetermined intervals the keying pulses become coded. The output of the blocking oscillator is applied to an inverted direct-coupled amplifier whose plate load is in series with its cathode resistor, and the cathode output thereof is utilized to grid modulate the ground transmitter.

The resulting coded "homing" signals are conveyed, through a T-R box to a common transmitter-receiver omnidirectional antenna, and thereby radiated into space.

The term "T-R box" stands for "transmit-receive." It is a duplexing circuit designed to substantially prevent ground transmitter output from entering and causing shock to the ground receiver during periods of transmission. It also serves, during periods of reception, to prevent signals received on the common antenna system from being dissipated into the transmitter section transmitting substantially the entire received signal to the input stage of the ground receiver. Networks of this type are well known and, since it does not per se constitute a part of my invention, it need not be described in detail.

Now some of the ground transmitter energy gets by the T-R box and excites the ground receiver, and if these signals are permitted to pass through said receiver, they are reconveyed to the modulator and fire the same. The condition thus established is known as "ring around" and must be avoided.

For this purpose, a portion of the output of the above mentioned blocking oscillator is so applied to the receiver, more particularly, to the detector and wide band video frequency amplifier stages thereof, that said receiver is rendered insensitive, in synchronism with the pulse transmission of the ground transmitter, for periods which extend slightly beyond the training edge of each transmitted pulse. The transmitter is thereby prevented from triggering itself.

In the accompanying specification there is described, and in the annexed drawing shown, what is at present considered a preferred embodiment of the responder of my present invention. It is, however, to be clearly understood that my present invention is not limited to said embodiment, inasmuch as changes therein may be made without the exercise of invention and within the true spirit and scope of the claims hereto appended.

In said drawing, the single figure is a partial block, partial circuit diagram of a responder for a radio beacon assembled in accordance with the principles of my present invention.

Referring now more in detail to the aforesaid preferred embodiment of the responder of my present invention, with particular reference to the drawing illustrating the same, the numeral 5 designates an omnidirectional antenna connected, through a conventional T-R box or duplexing circuit 6, to a receiver 7, preferably, a superheterodyne, and a transmitter 8.

Said receiver includes the usual radio frequency mixer, and intermediate-frequency stages 9, a second detector 10, and one or more wide band video frequency amplification stages 11. Said transmitter includes a pulse amplifier 12, a blocking oscillator 13, coding mechanism 14, a keying-pulse amplifier 15, and a radio-frequency oscillator 16; the amplifiers 12 and 15, and the blocking oscillator 13, together with the coding mechanism 14, constituting a modulator.

The detector 10 consists, more specifically, of a diode vacuum tube 17, the cathode of which is grounded through a resistor 18, and is receptive of the interrogating pulses from the intermediate frequency stages included in the box 9, through a coupling capacitor 19, and a tunable inductor 20 and by-pass capacitor 21 connected to ground, as shown. Ground is preferably raised above B— by connecting the same to a suitable point on a voltage divider 22 which shunts a B voltage supply. The plate of the diode 17 is connected through a resistance network 23—24, and a blocking capacitor 25, to ground, and said plate is negatively biased by connecting the junction of the resistor 24 and capacitor 25, through a grounded potentiometer 26, to a point on the voltage divider 22 which is negative with respect to ground. The purpose of this negative bias is to prevent the receiver noise from being reproduced by the detector, the amplitude of the noise being below the bias level.

The rectified output of the detector is applied, by means of a coupling capacitor 27 and a grounded grid resistor 28, to the control grid of the wide band video frequency amplifier 11. This amplifier preferably consists of a pentode vacuum tube 29, the cathode of which is grounded through a resistor 30, by-passed by a capacitor 31, and the suppressor grid of which is conventionally tied to said cathode. The screen grid of said tube is provided with a positive potential through a resistor 32, by-passed by a capacitor 33, and the plate thereof is likewise provided with a positive potential through a plate load resistor 34, and a second resistor 35 which, as will later be seen, serves a dual function, said second resistor being by-passed by a capacitor 36. The plate output of the wide band video frequency amplifier 11 is fed, through a coupling capacitor 37, to the modulator components of the transmitter 8.

More specifically, said output is applied across a resistor 38 and blocking capacitor 39, connected between the grid of the pulse amplifier 12 and ground, said amplifier comprising the right-hand section of a twin triode vacuum tube 40, the common cathode of which is grounded, and the plate of the amplifier of which is provided with a positive potential through the primary winding 41 of a 3-winding transformer 42. Said grid is biased negatively whereby said amplifier is normally cut off by an amount at least equal to the amplitude of any noise in the final output of the receiver 7.

The triggering pulses applied to the amplifier 12 appear with negative polarity at the plate thereof, but due to phase reversal introduced by one of the secondary windings, the winding 43, of the transformer 42, said pulses appear at the input to the blocking oscillator 13 with positive polarity.

Said blocking oscillator consists of the left-hand section of the tube 40. The plate of this oscillator is tied to the plate of the amplifier 12, thereby increasing the trigger sensitivity of the oscillator, the latter operating at a higher plate voltage than when a plate resistor and coupling capacitor is used. The blocking oscillator is normally biased beyond cut-off by connecting one end of the secondary winding 43 to a point on the voltage divider 22 which is negative with respect to ground. The other end of the winding 43 is connected through a resistance network, which will now be described, and the coding mechanism 14 to the grid of the oscillator, said winding being suitably by-passed by a capacitor 44.

The network to which reference has just been made, as will later be more fully explained, controls the period of the duty cycle of the blocking oscillator and, therefore, the width of the pulse output thereof. Said network includes a resistor 45 connected between the grid of the oscillator and a movable switch contact 46, the junction between said resistor and said contact being connected to the secondary winding 43 of the transformer 42. The contact 46 is adapted to cooperate with a fixed contact 47 which is connected to the oscillator grid through a resistor 48. The resistor 48 therefore shunts the resistor 45, and the entire network is by-passed by a capacitor 49, of sufficient capacitance to preserve the leading edge and general shape of the blocking oscillator pulse output.

The switch contacts 46—47 are operated by rotating discs 50 (only one of which can be seen in the drawing) provided with sharp and blunt projections 51 and 52 which intermittently close the switch for varying periods of time. The discs are mounted upon the shaft of a motor 53 connected to a source 54 of A. C.

The width of the pulse output of the blocking oscillator is determined by the time constant of the R-L circuit including the secondary winding 43 of the transformer 42 and the resistance network 45—48 connected between the same and the grid of the oscillator.

When the switch contacts 46 and 47 are closed, the resistor 48 shunts the resistor 45, and the lowered value of the resulting equivalent resistance increases the pulse width of the oscillator. The duration of the widened pulse is determined by the length of time the resistors 45 and 48 are connected in parallel, and this, in turn, is dependent upon which of the projections 51 or 52 is instantaneously engaging the contact 46.

The contacts 46 and 47 are shunted by a SPST switch 55, which is open when automatic coding is desired, closed when a constantly wide pulse is desired, and alternately closed and opened when manual coding is desired.

The output of the oscillator 13, which is obtained from a separate winding 56 of the transformer 42, is applied to the amplifier 15. This amplifier includes a twin-triode vacuum tube 57 the two sections of which are connected in parallel. The common cathode of said tube is connected, through a cathode resistor 58 and a load resistor 59, to B−, and the tied plates of said tube are grounded. The tied grids are connected to one end of the output winding 56 of the transformer 42, and the junction of the resistors 58 and 59 is connected to the other end of said output winding. The output from said amplifier is taken from the cathode thereof.

It will be noted that the amplifier 15 is inverted with respect to the power supply, and the load resistor thereof is in series with the cathode resistor. This arrangement permits direct coupling to the transmitter, thus eliminating waveform distortion. The amplitude of the input to the transmitter is increased, and cathode degeneration provides improved wave form and helps reduce the effects of varying transmitter grid impedance brought about by changes in repetition rate.

The R.-F. oscillator 16 includes a triode vacuum tube 60, in a parallel line circuit. The cathode of said tube is grounded, and the grid and plate thereof are connected to parallel lines 61, constituting part of a tank circuit. A shorting capacitor 62, at the cold end of the lines, completes the tank circuit, which may be tuned by adjusting the position of said capacitor along said lines. A variable capacitor 63, at the plate and grid end of the lines, adjusts the feedback and matches the tube 60 to the tank circuit.

The grid line of the tank is connected, through an R.-F. choke 64 and R.-F. by-pass capacitor 65, to the cathode of the amplifier 15, and the plate line of said tank is connected, through an R.-F. choke 66 and R.-F. by-pass capacitor 67, to a point of high positive potential on the voltage divider 22.

Energy from the oscillator tank is conveyed to the antenna 5 through a grounded pick-up loop 68.

Now, as stated in earlier portions of this specification, it is necessary to avoid the condition known as "ring around," or triggering of the transmitter by its own energy, and I accomplish this by reducing the sensitivity of the receiver 7, in synchronism with the pulse transmission of the transmitter, for periods which extend slightly beyond the width of each transmitted pulse.

To this end, a portion of the output of the secondary winding 43 of the blocking oscillator transformer 42 is applied, through a current-limiting resistor 69, to the grid of a triode vacuum tube 70. The cathode of said tube is grounded through a resistor 71, and is connected to the junction of the inductor 20 and capacitor 21 in the input circuit of the detector 10. Positive potential is applied to the plate of the tube 70 through the resistor 35. It is to be noted that the tube 70 is connected across part of the plate load resistance of the wide band video frequency amplifier 11, so that when the blocking oscillator grid pulse is applied to the tube 70, the drop across the resistor 35 is of such magnitude as to reduce the plate voltage on tube 11 and the sensitivity of said wide band video frequency amplifier, and thus the drive to the pulse amplifier 12. However, in order to permit the use of a resistor 35 of reasonable value and so avoid unduly sacrificing gain in the wide band video frequency amplifier, the rise in cathode potential of the tube 70 is applied to the cathode of the detector diode 17. This reduces the sensitivity of the detector and aids in maintaining the receiver output at a low level while the transmitter is on the air.

It might be pointed out that the capacitance of the capacitor 36 is chosen to slightly sustain the drop across the resistor 35 so that the shock of the lagging edge of the transmitted pulse cannot trigger the amplifier 12.

This completes the description of the aforesaid preferred embodiment of the responder of my present invention. It is thought that the mode of operation thereof is apparent from the foregoing and need not be further described here.

It is noted that I have provided a modulator for the responder of a radio beacon system which has sufficient sensitivity to enable low-intensity interrogating signals to fire the same and, at the same time, reject unwanted triggering signals in the form of the random noise of the receiver.

It will further be noted that bias and plate voltage variations will not cause the modulator to fire.

The width of the keying pulse generated by the modulator remains constant, even though the repetition rate of the triggering signals may vary.

Waveform distortion is maintained at a minimum, among other things, by utilizing direct coupling between the modulator and the transmitter. The amplitude of the keying pulses fed to the transmitter is high but the output impedance of the modulator has been maintained at a low value, thereby lessening the problem of matching.

Finally, it is to be noted that although the transmitter and receiver of the responder of my present invention utilizing a common antenna system, the energy generated by the transmitter is prevented from triggering said transmitter due to the condition known as the "ring around."

Other objects and advantages of the responder of my present invention will be obvious to those skilled in the art to which the same relates.

I claim:

1. In a responder for a radio beacon, in combination: receiving apparatus, including at least a detector and an amplifier, receptive of interrogating signals from craft seeking to "home" on the beacon; normally inoperative transmitting apparatus adapted to generate "homing" signals; an antenna system common to said receiving and transmitting apparatus; modulating apparatus, responsive to the output of said receiving apparatus, for keying said transmitting apparatus; and means, receptive of a portion of the output of said modulating apparatus, for decreasing the power normally supplied to said amplifier to reduce the sensitivity of said receiving apparatus in synchronism and for periods at least coextensive with the operating periods of said transmitting apparatus, whereby said transmitting apparatus is prevented from triggering itself.

2. In a responder for a radio beacon, in combination: receiving apparatus, including at least a detector and an amplifier, receptive of interrogating signals from craft seeking to "home" on the beacon; normally inoperative transmitting apparatus adapted to generate "homing" signals; an antenna system common to said receiving and transmitting apparatus; modulating apparatus, responsive to the output of said receiving apparatus, for keying said transmitting apparatus; and means, receptive of a portion of the output of said modulating apparatus, for decreasing the power normally supplied to said amplifier and simultaneously biasing said detector to reduce the sensitivity of said receiving apparatus in synchronism and for periods at least coextensive with the operating periods of said transmitting apparatus, whereby said transmitting apparatus is prevented from triggering itself.

3. In a responder for a radio beacon, in combination: receiving apparatus, including at least a detector and an amplifier, receptive of interrogating signals from craft seeking to "home" on the beacon; normally inoperative transmitting apparatus adapted to generate "homing" signals; an antenna system common to said receiving and transmitting apparatus; modulating apparatus, responsive to the output of said receiving apparatus, for keying said transmitting apparatus; and an electron discharge device, shunting at least a portion of the load of said amplifier and receptive of a portion of the output of said modulating apparatus, for decreasing the power normally supplied to said amplifier to reduce the sensitivity of said receiving apparatus in synchronism and for periods at least coextensive with the operating periods of said transmitting apparatus, whereby said transmitting apparatus is prevented from triggering itself.

4. In a responder for a radio beacon, in combination: receiving apparatus, including at least a detector and an amplifier, receptive of interrogating signals from craft seeking to "home" on the beacon; normally inoperative transmitting apparatus adapted to generate "homing" signals; an antenna system common to said receiving and transmitting apparatus; modulating apparatus, responsive to the output of said receiving apparatus, for keying said transmitting apparatus; and an electron discharge device, shunting at least a portion of the load of said amplifier and coupled to said detector, receptive of a portion of the output of said modulating apparatus, for decreasing the power normally supplied to said amplifier and simultaneously biasing said detector to reduce the sensitivity of said receiving apparatus in synchronism and for periods at least coextensive with the operating periods of said transmitting apparatus, whereby said transmitting apparatus is prevented from triggering itself.

5. In combination with a radio transmitter constituting a component of the responder of a radio beacon, modulating apparatus for said transmitter comprising: a normally inoperative relaxation oscillator adapted to be triggered by interrogating signals received from a craft seeking to "home" on the beacon; and an inverted direct-coupled vacuum tube amplifier, having its load circuit connected between its cathode load and a negative-potential point of its power supply, intermediate said oscillator and said transmitter.

6. In combination with a radio transmitter constituting a component of the responder of a radio beacon, modulating apparatus for said transmitter comprising: a normally inoperative relaxation oscillator adapted to be triggered by interrogating signals received from a craft seeking to "home" on the beacon; means for altering the normal width of the output of said oscillator for predetermined periods of time; and an inverted direct-coupled vacuum tube amplifier, having its load circuit connected between its cathode load and a negative-potential point of its power supply, intermediate said oscillator and said transmitter.

7. The combination set forth in claim 6, wherein said relaxation oscillator comprises a blocking oscillator having at least anode, cathode and grid electrodes, a grid leak resistance connected to said grid electrode, and means for changing the resistive value of said resistance network for predetermined periods of time, thereby altering the normal width of the output of said oscillator for said predetermined periods.

8. In a responder for a radio beacon, in combination: receiving apparatus, including at least a detector and an amplifier, receptive of interrogating signals from craft seeking to "home" on the beacon; normally inoperative transmitting apparatus adapted to generate "homing" signals; an antenna system common to said receiving and transmitting apparatus; modulating apparatus responsive to the output of said receiving apparatus for keying said transmitting apparatus; variable bias means to bias said detector and said modulating apparatus above randon noise levels; and means receptive of a portion of the output of said modulating apparatus for reducing the sensitivity of said receiving apparatus in synchronism and for periods at least coextensive with the operating periods of said transmitting apparatus, whereby said transmitting apparatus is prevented from triggering itself.

9. In a responder for a radio beacon substantially as set forth in claim 8, wherein said detector includes a diode having an anode and a cathode and said modulating apparatus includes a pulse amplifier having at least an anode, cathode and grid electrodes, the said variable bias means being electrically connected to said diode anode and to said grid electrode, whereby random receiver noises will be prevented from triggering the transmitter.

GERARD C. HESS.

REFERENCES CITED

The following references are of record in the file of this patent:

UNITED STATES PATENTS

| Number | Name | Date |
|---|---|---|
| 1,947,018 | Plastino | Feb. 13, 1934 |
| 2,414,992 | Wheeler | Jan. 28, 1947 |
| 2,415,667 | Wheeler | Feb. 11, 1947 |
| 2,425,315 | Atwood et al. | Aug. 12, 1947 |
| 2,429,513 | Hansen et al. | Oct. 21, 1947 |
| 2,453,970 | Charrier | Nov. 16, 1948 |

FOREIGN PATENTS

| Number | Country | Date |
|---|---|---|
| 337,469 | Great Britain | Nov. 3, 1930 |